Patented Sept. 5, 1933

1,925,372

UNITED STATES PATENT OFFICE 1,925,372

PROCESS OF DEINKING PRINTED PAPER

Elton R. Darling, Elgin, Ill., assignor to Mariner & Hoskins, Inc., Chicago, Ill., a corporation of Illinois No Drawing. Application November 14, 1931
Serial No. 575,151

13 Claims. (Cl. 92—13)

The present invention relates to a novel process for de-inking coated as well as uncoated printed paper, whereby the ink as well as any fillers contained in the paper are removed, leaving a fiber stock immediately usable for reconversion into new paper, cardboard, or the like.

One of the objects of the invention is to subject printed paper first to a solution containing alkali in such amounts that the hydrogen ion concentration of the solution will lie within a comparatively narrow range which may be defined as equivalent to that of a solution of sodium hydroxide having a pH of 9.0 to 12.6, followed by treatment of the paper by beating it in the same solution, so as to bring about a substantial disintegration, after which the ink and fillers are liberated and brought into suspension by the addition of a suitable emulsifying agent.

Another object of the invention is to remove printink ink from paper in an alkaline medium by the aid of an emulsifying agent comprising a water-soluble sulphonated petroleum hydrocarbon product.

Still a further object of the invention is to treat news stock and other unfilled papers in an alkaline medium with an emulsifying agent of the type above mentioned, with the addition of a finely divided suspensible insoluble medium having a particular attraction for loosened ink, whereby the ink will deposit itself upon said medium in preference to the cellulose fibers from which it has been released.

Other objects of the invention will become apparent from the description and claims to follow hereinbelow.

Many processes for the de-inking of paper have been described in the past, most of them depending for their action upon rather strong chemicals which either dissolve the vehicle of the ink or else destroy it by a process akin to saponification, so as thereby to liberate the carbon and other pigments constituting the color of the ink. In such a process, however, the chemicals employed are of such strength that they will deleteriously affect the cellulosic fibers of which the paper is constituted, thereby injuring the same and rendering the final de-inked product by no means as desirable as fresh paper pulp. Furthermore, the paper which has been de-inked by means of strong alkalies or saponifying agents yields a de-inked paper stock that is relatively dark and which either requires an abnormal amount of bleaching to bring it to acceptable whiteness or, under certain circumstances caused by a redeposition of colloidally dispersed carbon particles upon the paper, is simply unbleachable and can therefore be used only for manufacturing cheap cardboard or pulp articles.

It has already been proposed to employ various kinds of soap for the liberation of ink from paper, but in most instances this involves the employment of either high temperatures or solutions of such strength that the above enumerated inconveniences are unavoidably a part of the process.

Research undertaken by the inventor of the present process has demonstrated that there are certain alkalies or alkaline reacting compounds which are of specific value in the treatment of paper for the purpose of separating therefrom printing ink pigment and such fillers as may have been used in the coating of the paper or the sizing thereof. In most de-inking processes a particularly important factor has been overlooked, namely, the recovery of the fiber in substantially pure form, free from fillers, sizing material, pigment, and ink. The present inventor, realizing these difficulties, has therefore evolved a process in which there is first brought about a separation between the fibers of the paper on the one hand and the fillers, ink and pigment on the other hand, followed by the treatment of the resulting mixture with such emulsifying agents as will cause the fibers to segregate by themselves, while the fillers, pigment and ink form a complex which under the conditions of operation has no affinity for the cellulosic fibers, so that physical separation by means of filtration of the fibers from such suspended material as fillers and ink pigment is rendered commercially possible.

In case of the treatment of papers which do not contain any fillers, it has been found advisable in practicing the process of the present invention deliberately to add to the paper undergoing treatment inert fillers or mineral substances which have this affinity for the ink pigment, so as to insure the production of a substantially white, practically unharmed cellulosic paper pulp which may immediately be re-employed for the manufacture of fresh paper of a grade which will not be inferior to the original paper stock.

Concisely expressed, the process comprises treating printed paper with a solution containing sodium hydroxide and either sodium metasilicate or trisodium phosphate, the solution being of such a strenght that it has a hydrogen ion concentration equivalent to pH 9.0 to 12.6. While sodium hydroxide may be used alone, it is preferred to employ a combination of sodium hydroxide and metasilicate or sodium hydroxide and trisodium phosphate or, if desired, all three of these substances. However, the hydrogen ion concentration of the solution should lie within the range above given. The paper is beaten in a suitable paper beater with a solution of the composition just stated, the beating being sufficient to tear the paper into small shreds or particles so as to insure a thorough treatment and impregnation of the ink by the solution. During this portion of the process the vehicle of the ink is softened, but the ink will still adhere to the paper, having apparently an opposite charge to that of the paper particles themselves.

After beating for some time, there is then added an emulsifying agent which causes the separation of the ink from the paper, most probably by causing the ink to assume an opposite electrical charge so as to become repellant to the paper fibers. As an emulsifying agent, there may be employed either ordinary soap or a sulphonated oil made from a hydrocarbon base such, for example, as the oil made and described under the patents to Harold T. Maitland, Nos. 1,425,882; 1,425,893; 1,425,884 and 1,425,885. This sulphonated hydrocarbon oil has the peculiar property of being water miscible and is a powerful emulsifying agent but does not cause the material to foam as does ordinary soap. It therefore has particular advantages in this field, because it does not cause an overflow or undue frothing of the mixture while being agitated.

As soon as the emulsifying agent has been added, there will be almost immediate separation of the paper fibers from the fillers and sizing materials as well as the ink pigment, so that it becomes possible, after a short additional period of beating, to run the mixture of paper and solution in which it is suspended over a suitable filter or sieve which is fine enough to retain the individual fibers but sufficiently coarse to allow the escape of the solution and the finely divided fillers and ink pigment which pass off with the solution, leaving the paper fibers behind.

As an exemplification of the preferred proportions of material to be employed, it may be stated that the paper is treated with about 100 parts of water to each part of paper in an ordinary paper beater or hollander, the said water containing sufficient of the sodium hydroxide, sodium metasilicate and/or trisodium phosphate to give it the desired hydrogen ion concentration of pH 9.0 to 12.6. The duration of this beating is preferably about one hour. At the end of that time there is added for each 5 grams of paper present 10 ml. of a 1% soap solution or a 1% solution of the sulphonated oil in water, which is equivalent to 1/10 gram of soap to 5 grams of paper, or in the ratio of 1 part of soap or sulphonated oil to every 50 parts of paper. In other words, when treating a ton of paper, there would be required 1/50 ton or 40 pounds of soap or the said oil. The said sulphonated oil is quite dispersible in water and produces a sort of milky emulsion.

After the addition of the soap or oil, the beating is continued for about 20 minutes, until it is seen that the fibers have quite well separated from the fillers in the paper and the ink pigment. If the paper that is being treated does not contain any fillers, it is advisable, although not absolutely essential, to add a finely divided inorganic material such as finely powdered gypsum or land plaster, or a colloidal clay such as bentonite. The amount of such fillers added for this purpose may be on the order of from 10 to 25 pounds per ton of unfilled paper, such as newsprint, undergoing treatment. After adding this extraneous mineral matter, the beating is preferably continued a further 20 minutes so as to insure the gathering of the ink pigment upon the said mineral matter, so that it cannot redeposit upon the cellulosic fibers.

In either event, that is, when treating either coated or uncoated paper, the material is now ready for filtration to separate the cellulosic fibers from the pigment and fillers. This is accomplished by running it over a coarse sieve having meshes fine enough to hold the fibers but sufficiently coarse to let the fillers, ink pigment and dispersed ink vehicle pass through with the solution. It is preferred to do this without any suction, and the most advantageous manner of doing it is to pass the material over an ordinary screen such as is well known in the paper-making art. It is not advisable to employ any great degree of suction, as this tends to mat down the fibers and thereby causes physical entrapment of the pigment and fillers.

After the solution containing the suspended pigment and fillers, etc. is passed through the screen, the remaining cellulosic fibers may then be washed so as to insure the removal of any residual fillers and pigment, this being done either on the screen itself or, preferably, by transferring the wet mass of cellulosic pulp to a vessel containing clear water and thereupon again throwing this new mixture onto the screen. In localities where the water is hard and when soap has been used, it is advisable to employ a softened water or else to add sufficient alkali to the water so as to prevent the formation of insoluble calcium soap, which, if formed, would deposit itself upon the fibers and cause them to lose their brilliant white color. If such an alkaline washing solution is employed, this does not necessarily imply a waste of material, as the filtrate obtained from this washing step may, after correction for its hydrogen ion concentration, be employed for the first step in the treatment of a subsequent batch of printed paper. However, if the sulphonated oil is employed, this precaution will not be necessary. It is, of course, within the scope of the invention to employ both the soap and the oil, using reduced quantities of each, so that the combined weight of the oil and soap amounts to the ratio of about 1 to 50 (1:50) as based upon oil-soap and paper respectively.

In any event, and particularly when alkali is used in the wash water, the paper fiber is then further washed with pure water so as to remove the residual alkalinity thereof and produce a pulp suitable for the manufacture of new paper or paper product.

Ordinarily, when employing the present process, the fiber obtained is sufficiently white for commercial purposes, but it will, of course, not constitute a departure from the present invention to bleach the resulting pulp by any of the well known means.

The present process has been particularly useful in the removal of colored printing ink from highly coated magazine stock and similar papers, it being well known that the removal of modern rotogravure and process inks presents a problem difficult of solution and a problem which was never presented to prior inventors, as in the past ordinary printing inks based upon merely a linseed oil base were the most commonly employed, whereas the modern printing inks often contain synthetic resins and dyestuffs which are by no means as easy to remove as the ordinary old-style printing inks.

The temperatures employed in the treatment, it may be stated, may be anywhere between room temperature and about 180° F. (87° to 90° C.), the latter temperature being particularly suitable. As the hydrogen ion concentration approaches 12.6, it will be advisable to use a somewhat lower temperature, say 160° F. (or from 60° to 75° C.). Heating the solution in this manner accelerates the action, but the process will work even at room temperatures, provided the agitation is sufficiently prolonged.

What it is desired to protect by Letters Patent is:

1. The process of separating the cellulosic fibers of filled and printed paper from the printing ink and fillers therein contained which comprises beating the paper in a solution containing an alkaline reacting compound selected from the group consisting of sodium hydroxide, sodium metasilicate and trisodium phosphate in such proportions as to render said solution alkaline to the extent of having a hydrogen ion concentration of from pH 9.0 to pH 12.6 until the paper has been substantially disintegrated, and thereupon adding to the suspension thus formed a small amount of an emulsifying agent, continuing the beating for a short period of time, and thereupon filtering the suspension through a sieve fine enough to retain the cellulosic fibers but coarse enough to pass the fillers and ink particles.

2. The process of separating the cellulosic fibers of filled and printed paper from the printing ink and fillers therein contained, which comprises beating the paper in a solution containing an alkaline reacting compound selected from the group consisting of sodium hydroxide, sodium metasilicate and trisodium phosphate in such proportions as to render said solution alkaline to the extent of having a hydrogen ion concentration of from pH 9.0 to pH 12.6 until the paper has been substantially disintegrated, and thereupon adding to the suspension thus formed a small amount of soap, continuing the beating for a short period of time, and thereupon filtering the suspension through a sieve fine enough to retain the cellulosic fibers but coarse enough to pass the fillers and ink particles.

3. The process of separating the cellulosic fibers of filled and printed paper from the printing ink and fillers therein contained, which comprises beating the paper in a solution containing an alkaline reacting compound selected from the group consisting of sodium hydroxide, sodium metasilicate and trisodium phosphate in such proportions as to render said solution alkaline to the extent of having a hydrogen ion concentration of from pH 9.0 to pH 12.6 until the paper has been substantially disintegrated, and thereupon adding to the suspension thus formed a small amount of a water-dispersible sulphonated hydrocarbon oil, continuing the beating for a short period of time, and thereupon filtering the suspension through a sieve fine enough to retain the cellulosic fibers but coarse enough to pass the fillers and ink particles.

4. The process of de-inking printed paper, which comprises beating the same in a solution having a hydrogen ion concentration of between pH 9.0 to pH 12.6 until substantial disintegration of the paper has been effected, thereupon adding an emulsifying agent and an inert finely divided filler, continuing the beating for a short period of time, and thereupon filtering the resulting suspension through a sieve fine enough to retain the fibers of the paper but coarse enough to pass the particles of loosened printing ink and added filler.

5. The process of de-inking printed paper, which comprises beating the same in a solution having a hydrogen ion concentration of between pH 9.0 and pH 12.6 until substantial disintegration of the paper has been effected, thereupon adding soap and an inert finely divided filler, continuing the beating for a short period of time, and thereupon filtering the resulting suspension through a sieve fine enough to retain the fibers of the paper but coarse enough to pass the particles of loosened printing ink and added filler.

6. The process of de-inking printed paper, which comprises beating the same in a solution having a hydrogen ion concentration of between pH 9.0 and pH 12.6 until substantial disintegration of the paper has been effected, thereupon adding a water-miscible sulphonated hydrocarbon oil and an inert finely divided filler, continuing the beating for a short period of time, and thereupon filtering the resulting suspension through a sieve fine enough to retain the fibers of the paper but coarse enough to pass the particles of loosened printing ink and added filler.

7. The process as defined in claim 1, wherein the material remaining on the sieve after filtration is sludged up with an alkaline solution, refiltered, and washed.

8. The process of de-inking printed paper, which comprises comminuting the same while suspended in a solution of sodium hydroxide and sodium metasilicate having a hydrogen ion concentration of from pH 9.0 to pH 12.6, thereupon adding soap to the resulting suspension, beating the mixture thus formed, and then filtering the same through a sieve fine enough to retain the cellulosic fibers of the paper but coarse enough freely to pass the loosened ink particles and inert fillers which had been contained in said paper.

9. The process of de-inking printed paper, which comprises comminuting the same while suspended in a solution of sodium hydroxide and sodium metasilicate having a hydrogen ion concentration of from pH 9.0 to pH 12.6, thereupon adding a water-miscible sulphonated hydrocarbon oil to the resulting suspension, beating the mixture thus formed, and then filtering the same through a sieve fine enough to retain the cellulosic fibers of the paper but coarse enough freely to pass the loosened ink particles and inert fillers which had been contained in said paper.

10. The process of de-inking printed paper, which comprises comminuting the same while suspended in a solution of sodium hydroxide and sodium metasilicate having a hydrogen ion concentration of from pH 9.0 to pH 12.6, thereupon adding soap and a water-miscible sulphonated hydrocarbon oil to the resulting suspension, beating the mixture thus formed, and then filtering the same through a sieve fine enough to retain the cellulosic fibers of the paper but coarse enough freely to pass the loosened ink particles and inert fillers which had been contained in said paper.

11. The process of de-inking printed paper, which comprises comminuting the same while suspended in a solution of sodium hydroxide and sodium metasilicate having a hydrogen ion concentration of from pH 9.0 to pH 12.6, thereupon adding soap and insoluble finely divided mineral matter to the resulting suspension, beating the mixture thus formed, and then filtering the same through a sieve fine enough to retain the cellulosic fibers of the paper but coarse enough freely to pass the loosened ink particles and inert fillers which had been contained in said paper.

12. The process of de-inking printed paper, which comprises comminuting the same while suspended in a solution of sodium hydroxide and sodium metasilicate having a hydrogen ion concentration of from pH 9.0 to pH 12.6, thereupon adding a water-miscible sulphonated hydrocarbon oil, soap and insoluble finely divided mineral matter to the resulting suspension, beating the mixture thus formed, and then filtering the same through a sieve fine enough to retain the cellulosic fibers of the paper but coarse enough freely to pass the loosened ink particles and inert fillers which had been contained in said paper.

13. The process of de-inking printed paper which comprises first subjecting the same to the action of an aqueous solution having a hydrogen-ion concentration between pH 9.0 and 1.6, then adding to the resulting suspension an emulsifying agent that causes repellance between the fibers of the paper and the particles of the ink pigment, thereupon separating the fibers from the pigment and solution by filtration, sludging up the thus formed fiber mass with an alkaline solution, separating the fibers from said latter solution, and washing them substantially free from alkali.

ELTON R. DARLING.